Oct. 21, 1924.　　　　　　　　　　　　　　1,512,471
E. A. LARSSON
TROLLEY TENDER
Filed May 23, 1923　　　　2 Sheets-Sheet 1

Witness:
G. G. Allenbaugh

Inventor
ERNST A. LARSSON
By
Attorney

Oct. 21, 1924.
1,512,471
E. A. LARSSON
TROLLEY TENDER
Filed May 23, 1923
2 Sheets—Sheet 2

Witness:
G. G. Allenbaugh

Inventor
ERNST A. LARSSON.
By
Attorney

Patented Oct. 21, 1924.

1,512,471

UNITED STATES PATENT OFFICE.

ERNST A. LARSSON, OF MANSFIELD, OHIO, ASSIGNOR TO THE OHIO BRASS COMPANY, OF MANSFIELD, OHIO, A CORPORATION OF NEW JERSEY.

TROLLEY TENDER.

Application filed May 23, 1923. Serial No. 640,874.

*To all whom it may concern:*

Be it known that I, ERNST A. LARSSON, a citizen of the United States of America, residing at Mansfield, in the county of Richland and State of Ohio, have invented certain new and useful Improvements in Trolley Tenders, of which the following is a specification.

My invention relates to rope controlling devices used on vehicles for controlling the rope connected to the trolley pole and has particular reference to means for automatically oiling the moving parts of such devices commonly known as trolley tenders for checking and retrieving the trolley pole.

The object of my invention is to provide trolley catchers or trolley retrievers with means for automatically oiling the relatively movable parts of these devices whereby the parts are permitted to work more freely, more sensitive in their action and, therefore, operate more nearly as originally designed.

It has been the usual custom in sending out devices of this character for the manufacturer to lubricate the various moving parts with a heavy grease as this would remain adherent to the parts for a long time after being placed in use, but it was found that this heavy grease tended to retard the action or sensitiveness of the moving parts, especially if centrifugal dogs are used, and the dust and dirt entering the device would become mixed with the grease and the latter would harden or cake and thereby render the device inoperative.

In my present invention I provide trolley catchers or trolley retrievers with means for automatically furnishing the moving parts with oil which is very thin and mobile and, therefore, does not tend to cause the moving parts to stick, but at the same time offers lubrication to the moving parts so as to reduce friction and wear.

My invention resides in the new and novel construction, combination and relation of the various parts more fully hereinafter shown and described.

In the drawing accompanying this specification:

Figure 1:
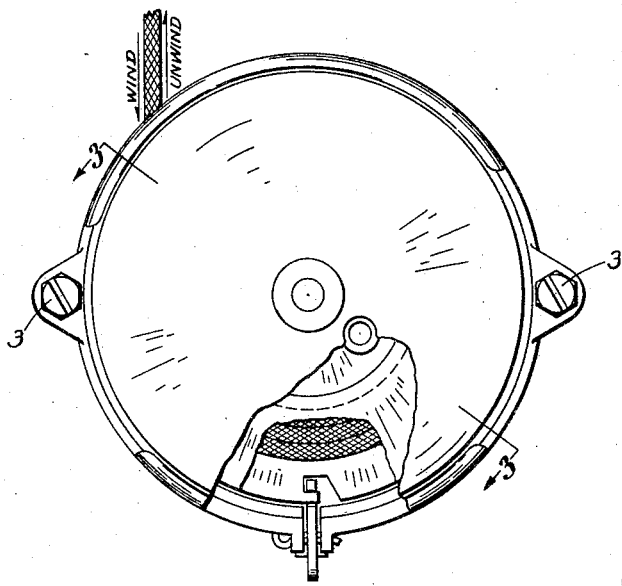
Fig. 1 is a front view of a rope controlling device commonly called a trolley catcher and shows a portion of the cover broken away thereby disclosing a locking arrangement for preventing rotation of the rope reel by the controlling spring.
Figure 2:
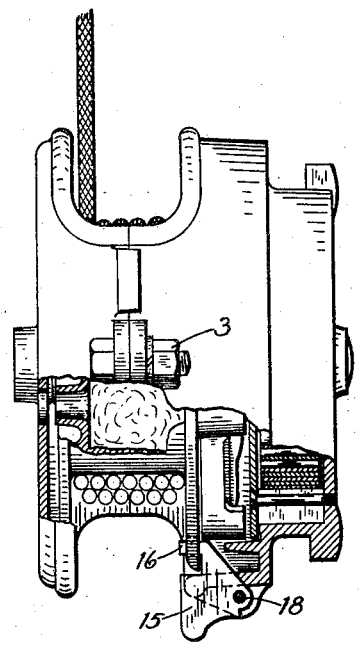
Fig. 2 is a side view of Fig. 1 in partial section and shows a side view of the locking arrangement referred to in Fig. 1.
Figure 3:
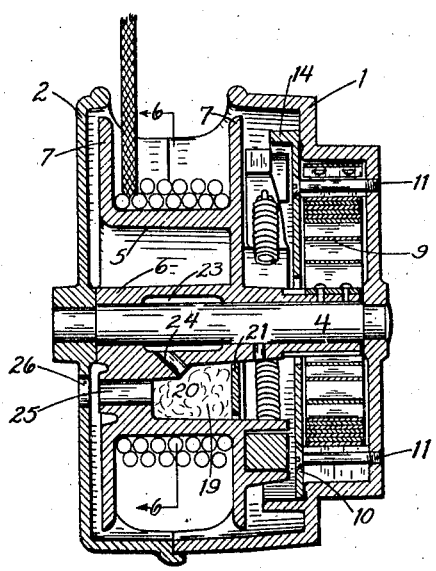
Fig. 3 is a sectional view on the line 3—3 of Fig. 1 and shows the means I employ for retaining the lubricating oil and the means for applying oil to said means.
Figure 4:
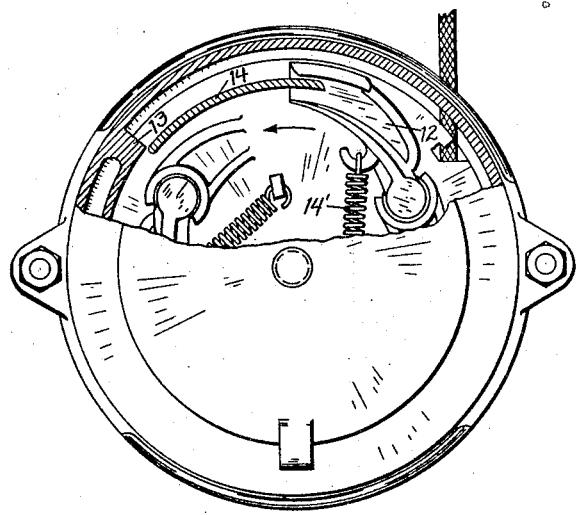
Fig. 4 is a back view of Fig. 1 in partial section showing a partial view of one centrifugal dog and a full view of another centrifugal dog in operative position for stopping the rotation of the rope reel in one direction after the reel has revolved a short distance.
Figure 5:
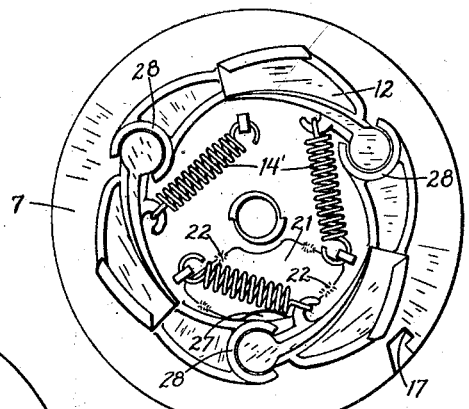
Fig. 5 is a back view of the reel and shows the distribution of the oil to the centrifugal dogs to maintain them in reoperative condition.
Figure 6:
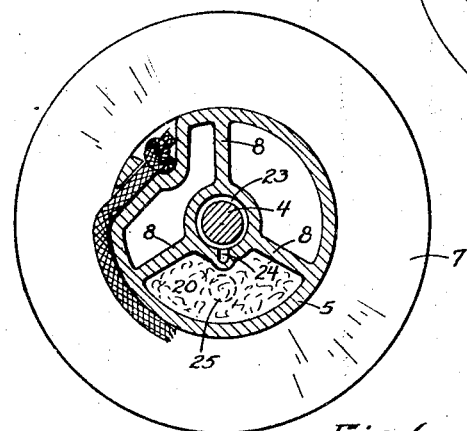
Fig. 6 is a sectional view of the rope reel taken on the line 6—6 of Fig. 3.

I have shown my invention as applied to a trolley catcher instead of a trolley retriever for the reason that the latter is much more complicated in design and much more difficult to show and explain although the application of my invention to a trolley retriever could be made in a similar way and operate in a similar way.

In the present embodiment of my invention I employ a case comprising a back member 1 and a front member 2 secured together by means of the bolts 3. Secured to the back member 1 is a shaft or spindle 4 upon which is rotatably mounted the rope reel 5 which is provided with a hub 6 and flanges 7 and the wings 8 for connecting the flanges and the hub together. Positioned in the back member 1 is a spring 9 which has its inner end secured to the hub 6, and its outer end secured to the back member 1 so that when the spring is under tension it is constantly urging the reel to rotate in one direction, depending upon the direction of winding of the spring 9. A partition plate 10 held in position by the screws 11 forms a compartment for the spring 9. The reel is provided with three centrifugal operating dogs 12 and the back member 1 is provided with a member 13 adapted to be engaged by any one of the centrifugal dogs when thrown outwardly by the rapid rotation of the reel, and hence prevent the rotation of the reel in one direction and opposite to that which is urged by the spring. The projecting member 14 engages the dog in such a manner that if the reel tends to rebound after the dog 12 engages the stop 13 the member 14 will still maintain the dog in operative relation as opposed to the action of the spring 14', which tends to hold the dog out of operative relation to the stop 13. This rebound is liable to occur when the trolley pole leaves the wire and it strikes an overhead obstruction, thereby causing the pole to rebound and the spring 9 then tending to wind the rope upon the reel. Another upward movement of the trolley pole would not be sufficient as a rule to cause the centrifugal dogs to be thrown outward and, therefore, the member 14 would maintain the dog and stop in operative relation during the rebound period.

In order to lock the reel against rotation at times I provide a pivoted latch 15 which has a nose 16 to engage in the recess 17 of the reel. The latch 15 is mounted on the back member 1 by means of the pin 18 and is free to be swung into and out of an engaging relation with the reel. When out of engagement with the reel, gravity holds the dog in an inoperative relation with the reel until engagement is brought about manually. I am not claiming anything new or novel in regard to the latch 15 in its operation in connection with the reel 5 as the same has been fully disclosed and covered in United States Letters Patent #1,277,421, dated September 3, 1918, but the latch member 15 plays an important function in connection with my invention, in that, it maintains the parts in a definite relative relation when replenishing the oil which is used in my invention. The reel is free to rotate in either direction when the latch 15 is out of engagement therewith.

Within the rope reel 5 I provide a chamber 19 which is filled with wool or cotton waste 20, or other material which will absorb and retain oil, but permitting the oil to seep out through capillary action or centrifugal action, etc. The material 20 is held in place by means of a cover 21 placed over the opening in the chamber and secured thereto by welding as at 22 or by other means as may be desired. The hub 6 is shown with a recess 23 and opening into the recess 23 from the chamber 19 is a small passage 24 which permits oil to pass from the chamber 19 to the recess 23. The oil which enters the recess 23 will spread along the surface of the shaft 4 and the hub 6 and maintain these parts in lubricated condition. Communicating with the chamber 19 is a passage 25 and oppositely disposed to the exterior opening of the passage 25 is a hole 26 in the front member 2. The hole 26 is also so located that when the latch 15 locks the reel 5 against rotation, that the passage 25 and hole 26 will coincide thereby permitting one to insert the nozzle of an oil can into the channel 25 and replace the oil which has seeped out of the material 20. The use of the latch 15 in connection with the reel 5 permits the one replenishing the oil to have both hands free for such operations as desired, and as the spring tension may have considerable tension tending to rotate the reel, the latch 15 removes the necessity of the operator watching the alinement of the hole 26 and passage 25.

The cover member 21 fits the chamber 19 rather loosely around the edge and there is also an opening 27 which permits free passage of the oil to the outer face of the reel. This oil is found to spread over the surface of the reel and to lubricate the dogs 12 within their pivotal bearing 28. The oil I find seeps out gradually and spreads over the surface uniformly and appears to be automatic in its supply and action, and it is only necessary to re-saturate the material 20 at quite long intervals of time.

A modification to my invention would be to materially increase the size of the cavity 23, to fill it with an oil absorbing and retaining material, such as 20, and to form passages leading from the enlarged cavity 23 to the parts to be oiled.

It will be quite apparent that the lubrication of the parts by means of oil as against a thick gummy grease is advantageous and permits a much freer and dependable operation of the moving parts than otherwise.

Having described my invention I claim:

1. In a trolley tender, the combination of a case, a rope reel rotatably mounted therein, centrifugally operated stop means to prevent the rotation of the reel with an increased rate of rotation of the reel above a predetermined rate, means to supply a lubricant to the centrifugal stop means comprising a supply of oil rotatable with the reel and means to convey the oil to the centrifugal stop means.

2. In a trolley tender, the combination of a case, a rope reel rotatably mounted therein, stop means comprising parts movable relative to the reel and case to stop the rotation of the reel in one direction when its rate of rotation exceeds a predetermined amount, means to lubricate the moving parts comprising a supply of oil rotatable with the reel and means to convey the oil to the moving parts.

3. In a trolley tender, the combination of a case, a rope reel rotatably mounted therein, means to rotate the reel in a rope winding direction, means to automatically check the rotation in a rope unwinding direction, means rotatable with the reel to lubricate the automatic check means comprising a supply of oil, means to retain the oil and means to permit the oil to reach the automatic check means.

4. In a trolley tender provided with a rotatable rope winding reel and movable means to check the rotation of the reel, a pocket in the reel, oil saturated material within the pocket, means permitting the oil to escape slowly from the pocket to lubricate the reel and moving parts, means of access to the pocket to replenish the oil and means to hold the reel against rotation and in a predetermined position while replenishing the oil.

5. In a trolley tender provided with a spring operated rotatable rope winding reel and means to check the rotation of the reel, a pocket in the reel, oil saturated material in the pocket, means permitting the oil to escape gradually from the pocket to lubricate moving parts, means of access in the reel to the pocket, means of access in the case to the means of access in the reel and means to hold the said means of access in a predetermined relation to permit access to the pocket to replenish the oil therein.

6. In a trolley tender provided with a spring rotated rope winding reel and means to automatically check the rotation of the reel, a pocket in the reel, oil saturated material in the pocket, means permitting the oil to reach moving parts, means of access in the reel to the pocket and means of access in the case to the means of access in the reel to replenish the oil in the pocket.

7. In a trolley tender provided with a rotatable reel and means to automatically check the rotation of the reel, a pocket in the reel, oil within the pocket, means to allow the oil to escape gradually from the pocket and means to replenish the oil within the pocket.

8. In a trolley tender provided with a rotatable rope winding reel and means to automatically check the rotation of the reel, a pocket in the reel to receive a quantity of oil, means of access to the pocket to supply oil thereto and means of exit for the oil from the pocket to lubricate the moving parts of the tender.

9. A trolley tender provided with a rotatable rope winding reel and means to check the rotation of the reel, a receptacle for oil, means of access to the receptacle to supply oil thereto and means of exit for the oil from said receptacle to lubricate the moving parts.

10. In a trolley tender provided with a rotatable rope winding reel and means to automatically check the rotation of the reel, a pocket in the reel to receive a quantity of oil, and means permitting the oil to escape from the pocket through centrifugal force and capillary attraction to lubricate the moving parts.

11. In a trolley tender provided with a spring controlled rope winding reel and means to automatically check the rotation of the reel, a pocket formed in the reel and having an opening at one side to receive a lubricant, a separately formed cover over said opening, means of access to the pocket, and means of exit from the pocket to permit the oil to lubricate the parts of the tender.

In testimony whereof I affix my signature.

ERNST A. LARSSON.